(12) United States Patent  
Abramson et al.

(10) Patent No.: US 7,461,336 B1  
(45) Date of Patent: Dec. 2, 2008

(54) SYSTEM AND METHOD FOR AUTOMATIC MAPPING OF HYPERTEXT INPUT FIELDS TO SOFTWARE COMPONENTS

(75) Inventors: Nathan Abramson, Cambridge, MA (US); Jeffrey J. Vroom, Jamaica Plain, MA (US)

(73) Assignee: Art Technology Group, Inc., Boston, MA (US)

( * ) Notice: Subject to any disclaimer, the term of this patent is extended or adjusted under 35 U.S.C. 154(b) by 0 days.

(21) Appl. No.: 09/209,015

(22) Filed: Dec. 10, 1998

(51) Int. Cl.
*G06F 17/00* (2006.01)

(52) U.S. Cl. ...................................... 715/237; 715/224
(58) Field of Classification Search ................ 707/507, 707/513; 715/513, 507, 505, 237, 221, 224
See application file for complete search history.

(56) References Cited

U.S. PATENT DOCUMENTS 5,163,130 A    11/1992   Hullot ........................ 395/148
6,173,288 B1 *   1/2001   Diedrich et al. ............. 707/102

FOREIGN PATENT DOCUMENTS

EP         0 499 404       8/1992
WO     WO 98/44695    10/1998

OTHER PUBLICATIONS

Netscape Livewire, Enterprise Server 2.0.1, Oct. 30, 1997.
Web Objects (Next/Apple), WODEVGUIDE 1.0, Mar. 28, 1996.
About Cold Fusion, User's Guide Cold Fusion 3.1, Nov. 6, 1997.
NCSA Httpd Server Sides Include, NCSA HTTPd Development Team, httpd@ncsa.uiuc.edu/Last Modified Jun. 13, 1995.

* cited by examiner

*Primary Examiner*—Laurie Ries
(74) *Attorney, Agent, or Firm*—Wilmer Cutler Pickering Hale & Dorr LLP

(57) ABSTRACT

A system and method for automatically mapping of hypertext input fields to software components. The system includes a hypertext preprocessor, a name-space manager, a data handler, and a component manager. The hypertext preprocessor examines the hypertext input field names and uses the name-space manager and component manager to determine the mapping between input field names and software component properties. When the hypertext page is rendered, the name-space manager registers the mapping between each submitted input field and the corresponding component property. When the input data is submitted, the data handler uses the name-space manager to find the component property for each submitted input field and uses the component manager to convert the data to the correct type before calling the appropriate component method to set the property value.

11 Claims, 6 Drawing Sheets

SYSTEM AND METHOD FOR AUTOMATIC MAPPING OF HYPERTEXT INPUT FIELDS TO SOFTWARE COMPONENTS

FIELD OF THE INVENTION

The present invention relates to the field of computer systems, and more particularly to systems which serve hypertext content over a network.

BACKGROUND OF THE INVENTION

When a user contacts a site over the Internet, there are a number of situations in which the site (the web server) has a need or interest in collecting information from the user. Such information can be, for example, for (1) registering for a service when the server wants to collect and maintain a record of registered users (whether for paying memberships or not), (2) entering information to access a service, such as a mortgage calculator, or (3) entering ordering information, such as a book seller wanting to have a user enter his or her name, address, and credit card number.

Referring to FIG. 1, a server 10 communicates with a user/client 12 over the Internet with a hypertext application, where "hypertext" refers to the ability to link one document to another. This application, such as a World Wide Web (web) application, can include one or more hypertext documents 14 that are provided to clients and that have input fields so that the user can fill in and submit input field data back to hypertext server 10. The submitted input field data is then processed by a software component 16 that receives the data and takes actions appropriate to the application. For example, in the example of a user entering his or her name and address to order books, the software component converts each address field to a correct data type, and executes the desired functionality to complete the purchase.

Hypertext documents are typically written in HyperText Markup Language (HTML), which uses tags to identify components and actions, such as <p> for new paragraph or <A HREF="document.html"> to create a link to another document. Textual input fields are designated by <INPUT> tags. Each of the input fields is given a name by the author of the hypertext document. For example, an input field for the book buyer's last name might be named "LAST_NAME," whereas the zip code might be named "ZIP_CODE." A common technique for processing such input data is to create a software component that is specialized for each individual hypertext document, such as a component designed to receive a book order. The software component parses the submitted data to search for the input fields with the appropriate names as such names have been programmed in the software component. If the correctly named input field is found, the component must further convert the submitted data in the input field to the correct data type. Thus the component designed to process the book purchase document would parse the input and search for a field named "LAST_NAME" and a field named "ZIP_CODE" as well as all of the other required fields. If these input fields are found, the data must be converted to the correct data type; for example, the "ZIP_CODE" data must be converted from text to an integer. The component can also determine if the form is correct, e.g., check to make sure that "ZIP_CODE" has five or nine numbers for a United States zip code.

Because the hypertext document is created and maintained separately from the software component that receives the input data (even though the two are associated with each other), the names of the input fields must be carefully maintained in the document and the component to correspond to each other. If the input field for the buyer's last name were misspelled in the hypertext document as "LST_NAME" (as shown in FIG. 1), the specialized software component would not find the input field, as it would be looking for "LAST_NAME." Furthermore, the software component must encode the correct data types of each input field, and this information must be coded for each such component and field. The component must encode, for example, the fact that the input field for the buyer's zip code must be converted to an integer and must handle various types of conversion errors.

Such an application is difficult to develop and maintain, as it is easy to introduce naming and type conversion errors as the hypertext documents and software components are separately modified. Furthermore, because the software components encode the specific names and types of each input field, each component is specialized for a particular hypertext document, and not practicably re-usable for other documents or applications.

SUMMARY OF THE INVENTION

The present invention provides a method and system for automatically mapping hypertext input fields in a document to software components so that input data is automatically converted to the correct data type and sent to the desired software component without any specialized coding within the component. The method and system have particular application to implementing servers for dynamic web applications.

In the preferred embodiment, the system includes a hypertext preprocessor, a name-space manager, a data handler, and a component manager. The hypertext preprocessor examines hypertext input field declarations and uses the name-space manager and component manager to map the input fields to software component properties. When the hypertext page is created, the name-space manager registers the mapping between each submitted input field name and the corresponding software component property. When the input data is submitted to the server, the data handler uses the name-space manager to find the component property for each submitted input field and uses the component manager to convert the data to the correct type before calling the appropriate component method to set the property value.

The hypertext application server system thus provides automatic mapping between hypertext input fields and data type conversion, thereby facilitating the development and maintenance of the application and the re-use of software components, and further avoiding data type and/or naming errors. Other features and advantages will be apparent from the following detailed description, drawings, and claims.

DETAILED DESCRIPTION

A method and system for automatically mapping hypertext input fields to software components and for automatically converting the input to correct data types have particular application for implementing servers for dynamic web applications. In the following description for purposes of explanation, specific numbers, materials, and configurations are set forth in order to provide a thorough understanding of the present invention. However, it will be apparent to one skilled in the art that the present invention may be practiced without the specific details.

Figure 2:
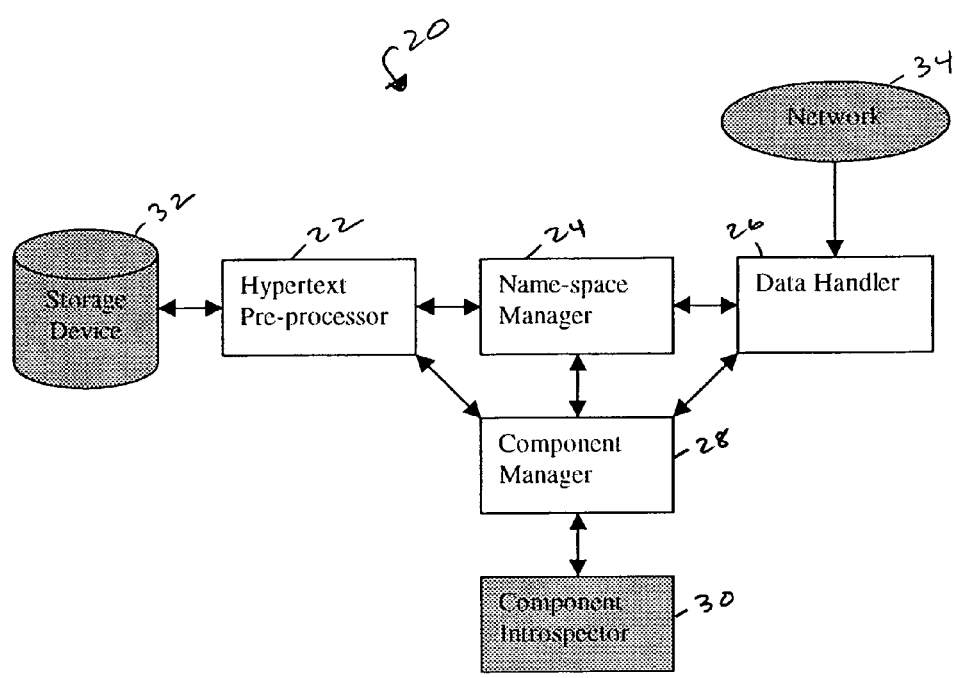
FIG. 2 is a block diagram of a hypertext application server system incorporating the system and method of the present invention.

Referring to FIG. 2, a block diagram illustrating an exemplary hypertext application server system 20 is shown. Server system 20 includes a hypertext preprocessor 22, a name-space manager 24, a data handler 26, and a component manager 28. Additionally, the server system also comprises a component introspector 30, a storage device 32, and a network 34. Hypertext preprocessor 22 is coupled to the name-space manager 24, component manager 28, and storage device 32. Data handler 26 is coupled to name-space manager 24, component manager 28, and network 34. Component manager 28 is coupled to component introspector 30, preprocessor 22, name-space manager 24, and data handler 26.

Component introspector 30 is preferably a standard component of Sun Microsystems, Inc.'s commercially available Java Development Kit software, and the storage device and network systems are standard components of any common computer and operating system such as a Sun Microsystems server running the SUN SOLARIS operating system or an IBM PC compatible computer running the Microsoft WINDOWS NT operating system (SUN SOLARIS and WINDOWS NT are registered trademarks of Sun Microsystems, Inc. and Microsoft Corp., respectively). The component introspector, the storage device, and the network, are intended to represent a broad category of these well known elements found in many computer systems. The storage device stores information from which the hypertext documents are created, and the network is the means by which input data is provided from the user.

Preprocessor 22, name-space manager 24, data handler 26, and component manager 28 are preferably implemented by software in hardware in a server. As is well-known, a typical server would include at least a processor and memory for storing and executing programs and storing data during execution, and would typically include a storage device such as a hard drive.

Figure 3:
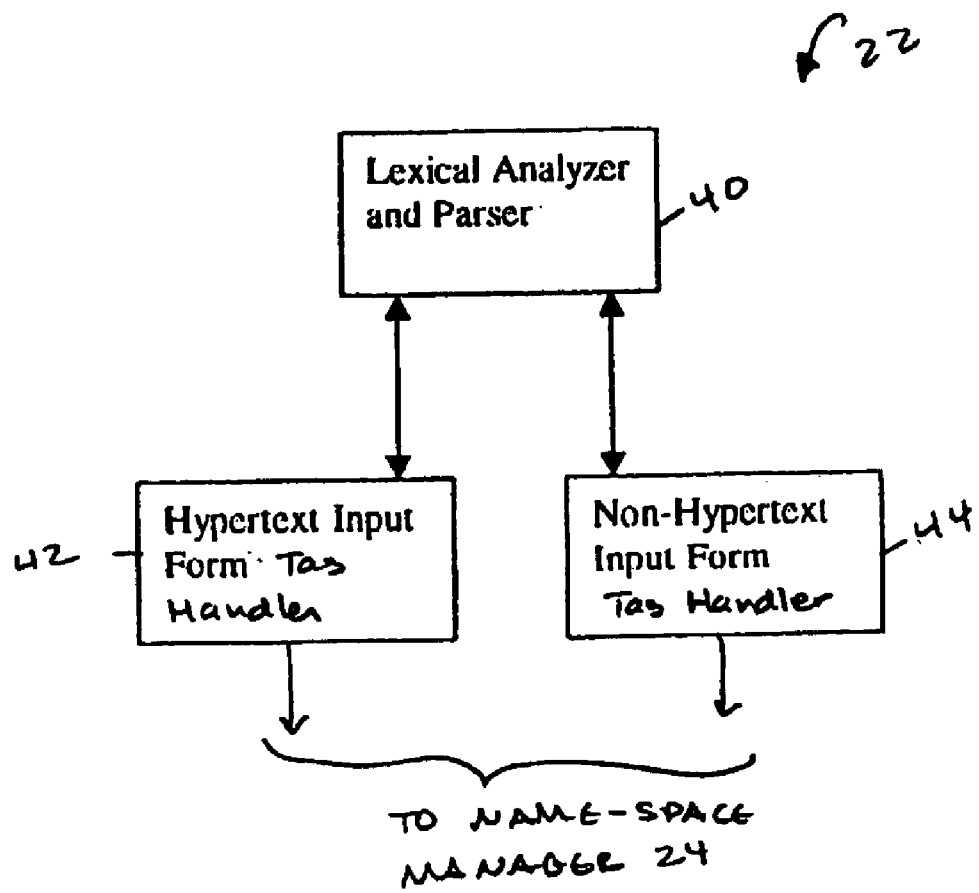
FIG. 3 is a block diagram of an embodiment of the hypertext preprocessor shown in FIG. 2.

Referring to FIG. 3, an embodiment of hypertext preprocessor 22 is shown. Preprocessor 22 includes a lexical analyzer and parser 40 coupled to a hypertext input form tag handler 42 and a non-hypertext input form tag handler 44. These tag handlers transform a hypertext document with input fields into target program code suitable for further compilation or interpretation when the hypertext document is rendered for the viewer. The hypertext input fields are produced as instructions to register the appropriate input field with the software component in the name-space manager, in addition to emitting the appropriate hypertext data required to render the desired input field.

Lexical analyzer and parser 40 scans the hypertext document for character sequences that denote hypertext input form tags that encode the start and end of a set of input fields as well as the input fields themselves, e.g., in HTML looking for <INPUT> to denote a textual input field, <FORM> and </FORM>, that indicate the beginning and end of a set of input fields. This scanning is performed using well-known parsing and analysis techniques. Input form tags are sent to the input form tag handler and non-input form tags are sent to the non-input form tag handler.

Both handlers produce target program code. The input form tag handler emits instructions that calls name-space manager 24 to register a mapping between the name of an input field and the name of the desired component property so that when the hypertext document is rendered, the name mapping will have been registered before the user submits input data. Instructions are also emitted to produce the input form tag with a current value of the component property pre-filled in; for example, if the server knows in advance the name of the user, the user's name and other information can be filled in as a default. In addition, the input form tag handler emits instructions to encode the entire hypertext input form with a unique name and to register the unique name with the name-space manager so that all of the input fields in a given input form are associated together. The non-input form tag handler emits the appropriate instructions to handle non-input form tags. The emitted program code can be source code or object code, and can be of a compiled or interpreted programming language.

In HTML, the input form tags include <FORM>, <INPUT>, <SELECT>, and <OPTION>, and can take different forms, including checkboxes, selectable lists, and textual input fields. According to the present invention, the desired component property is indicated by extending the syntax of the standard HTML input tags with a "property" keyword. For example the following hypertext indicates an HTML form with a text input field named "LAST_NAME" mapped to the "lastName" property of the "UserData" software component:

<FORM method=POST action="/pagejhtml">

<INPUT type=TEXT name="LAST_NAME" property="UserData.lastName">

</FORM>

The above HTML tags would be encoded as instructions to map the "LAST_NAME" input field to the "lastName" property of the "UserData" software component and to emit following hypertext:

<FORM method=POST action="/page.jhtml?_DARGS=/page.jhtml">

<INPUT type=TEXT value="Smith" name="LAST_NAME">

</FORM>

In the above example, the input form was encoded with the unique name "/page.jhtml" as indicated by the "_DARGS=/page.jhtml" attached to the action parameter of the HTML FORM tag. The LAST_NAME input field is pre-filled with the current value of the "lastName" property of the "UserData" component, i.e., "Smith."

Figure 4:
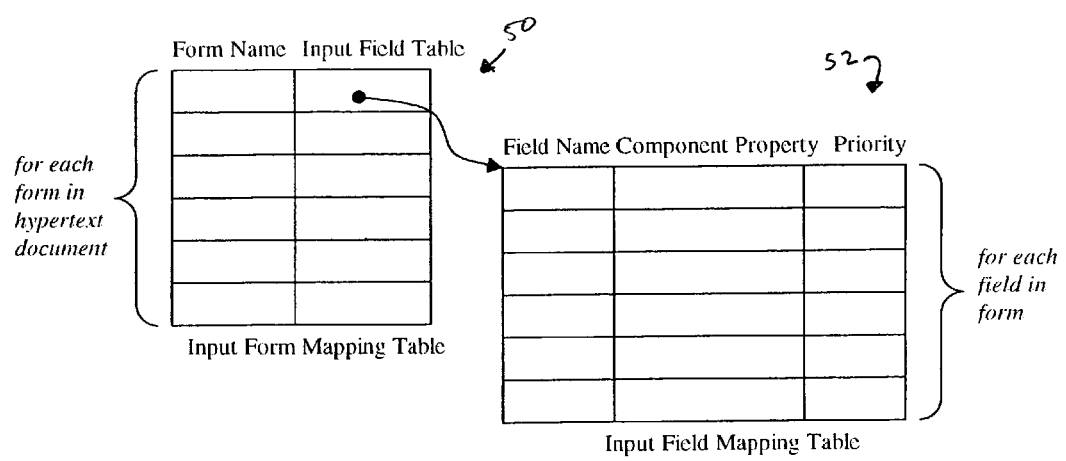
FIG. 4 is a block diagram of an embodiment of the name-space manager shown in FIG. 2.

Referring to FIG. 4, an embodiment of name-space manager 24 is shown. Name-space manager 24 includes an input form mapping table 50 and one or more input field mapping tables 52. Input form mapping table 50 maps an entry for the encoded name of the hypertext input form to an entry that points to an input field mapping table 52. Input field mapping table 52 maps an input field name to the desired component property name and to the processing priority.

Name-space manager 24 handles calls from the code emitted by the hypertext preprocessor to register a new uniquely named input form by creating a new input field mapping table and by storing the mapping of the form name to the field mapping table in the input form mapping table. Further mappings between input field names and component properties are stored in the created input field mapping table and associated with a relative priority. In the preferred embodiment, priorities can be set explicitly through the "priority" keyword extension to HTML input form tags. In addition, certain tags have special default priorities causing them to be ordered at the top or bottom of the input field mapping table priority, forcing the processing of other input fields before or after the input field in question.

Figure 5:
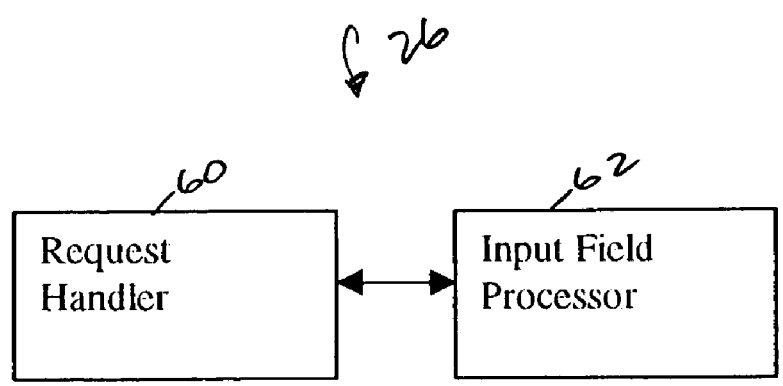
FIG. 5 is a block diagram of an embodiment of the data handler shown in FIG. 2.

Referring to FIG. 5, an embodiment of data handler 26 includes a request handler 60 and an input field processor 62 coupled together. Request handler 60 examines each hypertext request to determine if there is data submitted from an input form that was encoded with a unique name through the process previously described. If the request contains such a data submission, request handler 60 looks to table 50 in the name-space mapper to identify the appropriate input field mapping table 52, and invokes input field processor 62. Input field processor 62 iteratively processes each item in input field mapping table 52 in order of the priority designated in mapping table 52 to determine if data for that field was submitted. Each input field name is matched against the submitted data. If an input field data submission is found, the input field processor calls component manager 28 (FIG. 2) which finds the mapped component property, converts the data to the appropriate data type, and calls the component method to set the property with the converted data.

Figure 6:
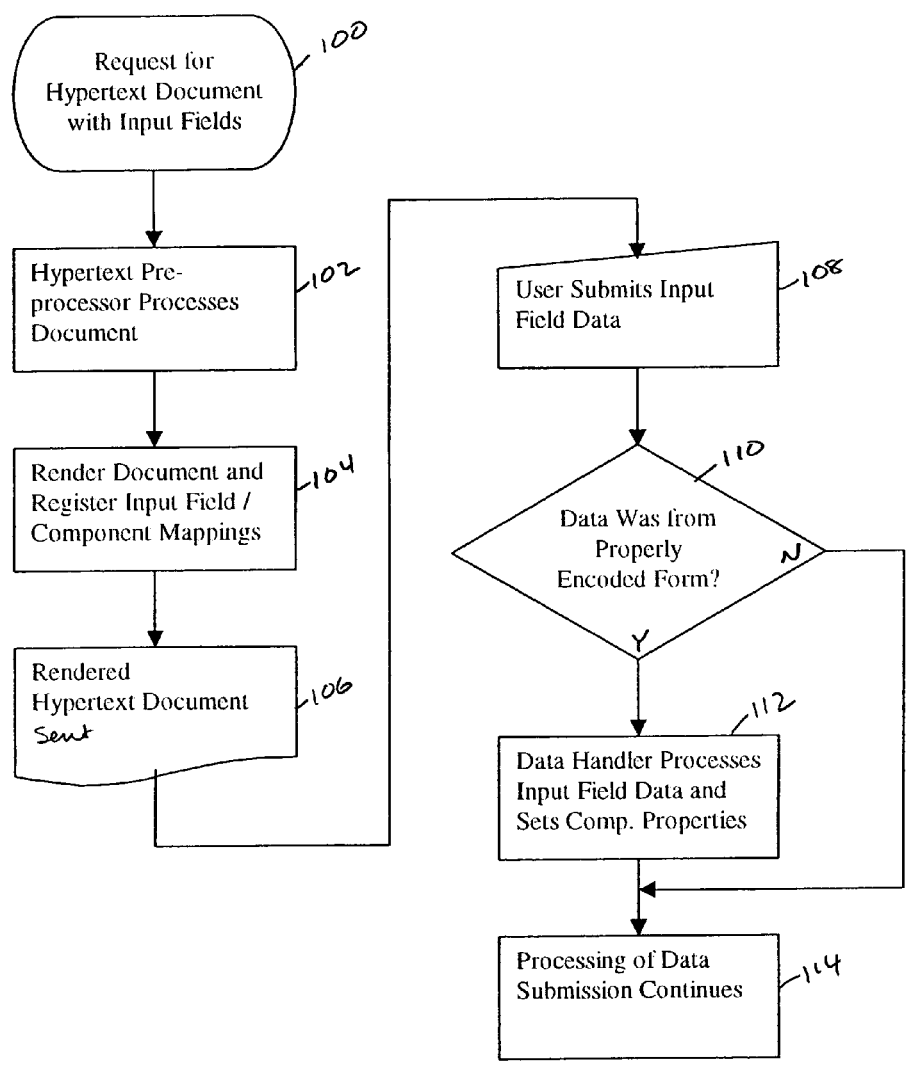
FIG. 6 is a flow chart of an embodiment of an automatic mapping method according to the present invention.

Referring to FIG. 6, an embodiment of the cooperative operation flow of the present invention is shown. Upon receiving a request from a user for a hypertext document that contains input fields (100), the hypertext preprocessor processes the document by emitting program code instructions that register the mappings between input field names and component property names when the document is rendered (102). The document is then rendered, the mappings are established with the name-space manager (104), and the rendered hypertext document is sent to the user (106).

When the user fills in the input fields and submits the input field data (108), the data handler determines if the submitted data was from an input form that was properly encoded with a unique input form name (110). If so, the data handler processes the input fields according to the previously established mapping by converting the input data to the correct types and setting the target component properties (112). Once the properties are set, further processing of the submitted data can be carried out by the system (114).

Figure 1:
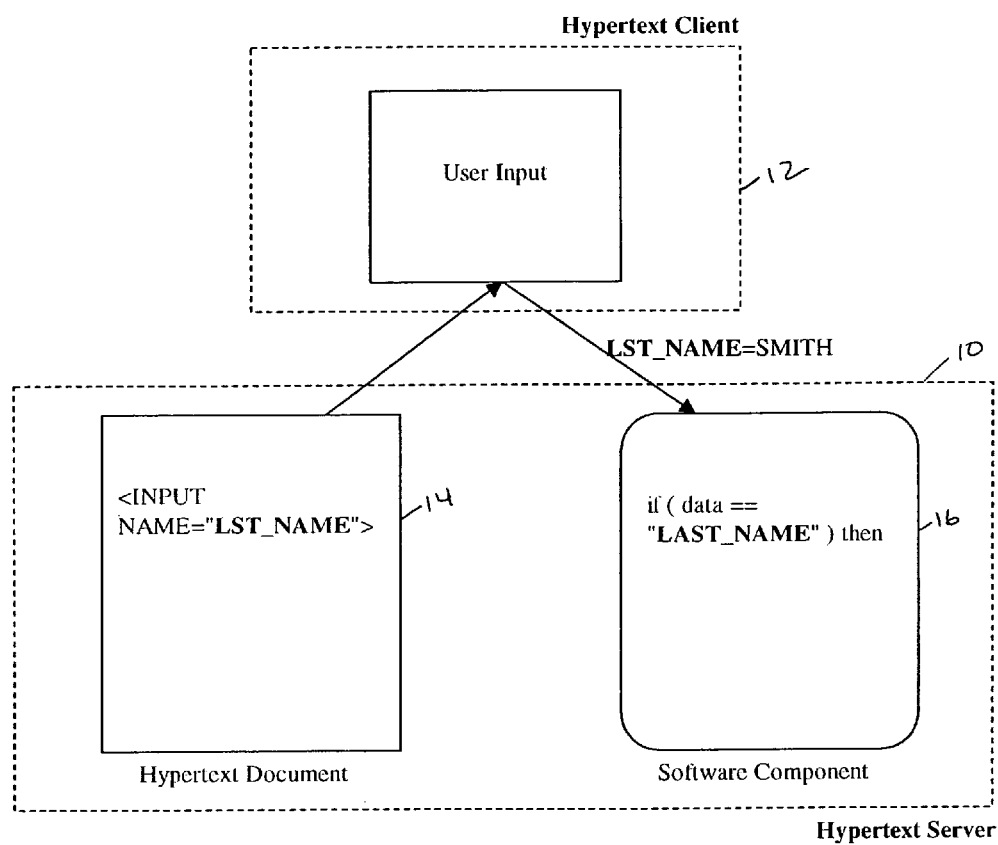
FIG. 1 is a block diagram showing prior art processing of hypertext input data by software components.

Accordingly, in the example given in FIG. 1, if the document has a field named "LST_NAME" in a form, the name of the form will be in table 50, and the field name "LST_NAME" will be in an entry in table 52, along with its respective component property and priority. The component can then recognize that the information identified as "LST_NAME" can be appropriately processed, rather than looking for a specified "LAST_NAME" and not finding input data under that name. The system and method thus link the fields in the document to the fields received by the software component, rather than treating these two names as independent.

While the present invention has been described in terms of presently preferred and alternate embodiments, those skilled in the art will recognize that the invention is not limited to the embodiments described. The method and system of the present invention can be practiced with modification and alteration within the spirit and scope of the appended claims. The description is thus to be regarded as illustrative instead of limiting on the present invention. For example, while the name-space manager has been described as two tables, it could be implemented with one table or with three or more tables.

What is claimed is:

1. A method implemented by a server system for communication with a user over the Internet, the method comprising:
the server system rendering a hypertext document including emitting program code instructions for registering the mappings between input field names in the hypertext document and software component property names in an input field mapping table when the hypertext document is rendered, a software component being a server-based component that uses data from the input field for processing;
the server system maintaining an input form mapping table to map forms to input field tables in an input form mapping table, and linking the input field table to the input field mapping table;
the server system providing the rendered hypertext document to a user;
the server system receiving from the user input field data entered in at least one named input field;
the server system determining from the mapping a software component property mapped to the named input field; and
the server system calling the software component for processing the input field data, the mapping being performed such that the fields in the document are linked to fields received by the software component and such that the software component can process the input field data without requiring that the name of the input field in the hypertext document match a corresponding field name in the software component.

2. The method of claim 1, wherein the rendering includes emitting hypertext form tags with a current value of an input field pre-filled in.

3. The method of claim 1, wherein the mapping includes encoding the hypertext input form with a unique name and registering the name.

4. The method of claim 3, wherein the receiving includes determining if the user submitted input field data is from a hypertext input form and bypassing input field processing if the determination cannot be made.

5. The method of claim 1, wherein the determining includes iteratively processing input names associated with a component property to determine if data associated with any of the input names has been entered.

6. The method of claim 5, wherein the determining includes processing in order of priority stored with the mapping of the input field names.

7. The method of claim 1, further comprising converting the submitted input field data to a correct data type.

8. A web server system embodied in a computer readable medium comprising:
- a preprocessor for generating program code to register mappings between hypertext input field names and software component properties and to emit hypertext form tags, the software component being a server-based component that uses data from the input field for processing;
- a name-space manager for registering the mappings; and
- a data handler, responsive to input data submitted by a remote user with an input field name, for using the mappings in the name-space manager to associate the input field names with the appropriate component properties, and for calling the software component to process the input data, the mapping allowing the software component to process the entered data of if the name of the input field in the hypertext document does not match the corresponding field name in the software component.

9. The system of claim 8, wherein the name-space manager includes a table for mapping a form to input fields, and for mapping input fields to a component property.

10. The system of claim 8, wherein the name-space manager includes a table for mapping a form to input fields, and for mapping input fields to a priority that determines the order in which the data handler processes the input field mappings.

11. The system of claim 8, wherein the data handler converts the submitted input data to a correct data type.

* * * * *